(12) United States Patent
Yang et al.

(10) Patent No.: US 10,960,772 B2
(45) Date of Patent: Mar. 30, 2021

(54) VEHICLE AND DC-DC CONVERTER FOR A VEHICLE

(71) Applicants: HYUNDAI MOTOR COMPANY, Seoul (KR); KIA MOTORS CORPORATION, Seoul (KR); Korea University Research and Business Foundation, Seoul (KR)

(72) Inventors: JinYoung Yang, Hanam-si (KR); Taejong Ha, Seoul (KR); Youngjin Kim, Incheon (KR); Yong Sin Kim, Seoul (KR); Sang-hun Lee, Seoul (KR)

(73) Assignees: HYUNDAI MOTOR COMPANY, Seoul (KR); KIA MOTORS CORPORATION, Seoul (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 16/697,836

(22) Filed: Nov. 27, 2019

(65) Prior Publication Data

US 2020/0094708 A1 Mar. 26, 2020

Related U.S. Application Data

(62) Division of application No. 15/638,785, filed on Jun. 30, 2017, now Pat. No. 10,525,831.

(30) Foreign Application Priority Data

Nov. 25, 2016 (KR) .......................... 10-2016-0158214

(51) Int. Cl.
*B60L 15/20* (2006.01)
*H02M 3/335* (2006.01)
(Continued)

(52) U.S. Cl.
CPC ....... *B60L 15/2045* (2013.01); *B60L 11/1811* (2013.01); *B60L 50/52* (2019.02);
(Continued)

(58) Field of Classification Search
CPC ...... B60L 11/1811; B60L 53/20; B60L 58/12; B60L 58/20; B60L 15/2045; H02M 1/34; H02M 3/33569; H02M 1/14; B60R 16/04
(Continued)

(56) References Cited

U.S. PATENT DOCUMENTS 10,086,711 B2 * 10/2018 Kawamura ......... H02M 3/3376
2009/0059622 A1 * 3/2009 Shimada ........... H02M 3/33584
363/17
(Continued)

FOREIGN PATENT DOCUMENTS

KR 10-2016-0158214 11/2016

*Primary Examiner* — Rexford N Barnie
*Assistant Examiner* — Swarna N Chowdhuri
(74) *Attorney, Agent, or Firm* — Lempia Summerfield Katz LLC

(57) ABSTRACT

A direct current (DC)-DC converter is for a vehicle for converting a first voltage output of a first battery to a second voltage output of a second battery. The DC-DC converter includes a transformer, at least one switch, at least one rectifying diode, and a snubber circuit. The transformer is configured to transform the first voltage to the second voltage. The at least one switch is configured to control a first current input to the transformer from the first battery. The at least one rectifying diode is configured to rectify an alternate current (AC) output from the transformer. The snubber circuit is configured to prevent overvoltage from being applied to the at least one rectifying diode.

9 Claims, 15 Drawing Sheets

(51) Int. Cl.
  *H02M 1/34* (2007.01)
  *B60L 58/20* (2019.01)
  *B60L 53/20* (2019.01)
  *B60L 50/52* (2019.01)
  *B60L 11/18* (2006.01)
  *B60R 16/04* (2006.01)
  *H02M 1/14* (2006.01)

(52) U.S. Cl.
  CPC ............... *B60L 53/20* (2019.02); *B60L 58/20* (2019.02); *B60R 16/04* (2013.01); *H02M 1/34* (2013.01); *H02M 3/33569* (2013.01); *H02M 3/33576* (2013.01); *H02M 1/14* (2013.01); *H02M 2001/346* (2013.01); *Y02T 10/64* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(58) Field of Classification Search
  USPC .......................................................... 307/10.7
  See application file for complete search history.

(56) References Cited

U.S. PATENT DOCUMENTS

| | | | | |
|---|---|---|---|---|
| 2014/0126247 A1* | 5/2014 | Koch | ................ | H02M 3/33507 363/21.14 |
| 2014/0361750 A1* | 12/2014 | Lee | ........................ | B60L 53/20 320/137 |
| 2015/0102765 A1* | 4/2015 | Lee | ........................... | H02J 7/02 320/107 |
| 2016/0121749 A1* | 5/2016 | Mensah-Brown | ...... | B60L 50/15 307/10.1 |
| 2016/0365801 A1* | 12/2016 | Phadke | ................... | H02M 1/34 |

\* cited by examiner

VEHICLE AND DC-DC CONVERTER FOR A VEHICLE

CROSS-REFERENCE TO RELATED APPLICATION

This application is a division of U.S. patent application Ser. No. 15/638,785 entitled "VEHICLE AND DC-DC CONVERTER FOR A VEHICLE" and filed Jun. 30, 2017, and which claims priority to and the benefit of Korean Patent Application No. 10-2016-0158214 filed on Nov. 25, 2016 in the Korean Intellectual Property Office. The entire contents of these prior filed applications are incorporated herein by reference.

BACKGROUND

1. Field

The present disclosure relates to a vehicle and a DC-DC converter for the vehicle.

2. Discussion of Related Art

Vehicles run on roads or tracks with a power source of fossil fuel, electricity, etc.

Fossil fuel based vehicles may emit fine dust, water vapor, carbon dioxide, carbon monoxide, hydrocarbon, nitrogen, nitrogen oxide, and/or sulfur oxide due to combustion of the fossil fuel. The water vapor and carbon dioxides are known to contribute to global warming, and the fine dust, carbon monoxide, hydrocarbon, nitrogen oxide and/or sulfur oxide are known to be air pollutants, which may be harmful to humans.

For this reason, vehicles using clean energy instead of the fossil fuel are being developed these days. For example, hybrid electric vehicles (HEVs) using both fossil fuel and electricity, electric vehicles (EVs) only using electricity, etc., are being developed.

The HEVs and EVs are equipped with an extra high-voltage battery for supplying power to an electric motor to move the vehicle, and a low-voltage battery for supplying power to electric parts of the vehicle. In addition, it is common for the HEVs and EVs to include a converter for converting a voltage of the high-voltage battery to a voltage for the low-voltage battery to supply power from the high-voltage battery to the low-voltage battery.

SUMMARY

The present disclosure provides a direct current (DC)-DC converter to prevent damage to devices and a vehicle having the DC-DC converter.

In accordance with one aspect of the present disclosure, a vehicle may include a first battery configured to output power at a first voltage, a second battery configured to output power at a second voltage, and a direct current (DC)-DC converter configured to convert the first voltage of the first battery to the second voltage and supply power at the second voltage to the second battery. The DC-DC converter may include: a transformer configured to transform the first voltage to the second voltage; at least one switch configured to control first current input to the transformer from the first battery; at least one rectifying diode configured to rectify alternate current (AC) output from the transformer; and a snubber circuit configured to prevent overvoltage from being applied to the at least one rectifying diode.

The snubber circuit may include a plurality of diodes connected in series to one another, an inductor connected in series to the plurality of diodes, and at least one capacitor connected in parallel with the plurality of diodes.

The plurality of diodes may include a first diode, a second diode, and a third diode connected in series to one another. The at least one capacitor may include a first capacitor connected in parallel with the first diode and the second diode, and a second capacitor connected in parallel with the second diode and the third diode.

The first capacitor and the second capacitor may be connected in series via the second diode while a voltage applied to the at least one rectifying diode is increasing.

The first capacitor and the second capacitor are connected in parallel via the first diode and the third diode while a voltage applied to the at least one rectifying diode is decreasing.

The transformer may include a primary coil and a secondary coil. The first coil is configured to receive the first current. The secondary coil is configured to induce second current according to a magnetic field produced by the primary coil. The secondary coil may be divided by a center tap into first and second coils.

The at least one rectifying diode may include a first rectifying diode with an anode connected to the first coil of the secondary coil, and a second rectifying diode with an anode connected to the second coil of the secondary coil. Cathodes of the first rectifying diode and the second rectifying diode may be connected to each other.

The snubber circuit may have one end connected to the center tap of the secondary coil and the other end connected to the cathodes of the first rectifying diode and the second rectifying diode.

The transformer may include a primary coil configured to receive the first current and a secondary coil configured to induce second current according to a magnetic field produced by the primary coil.

The at least one rectifying diode may include a first rectifying diode with an anode connected to an end of the secondary coil, and a second rectifying diode with an anode connected to the other end of the secondary coil. Cathodes of the first rectifying diode and the second rectifying diode may be connected to each other.

The snubber circuit may have one end connected to the other end of the secondary coil, and the other end of the snubber circuit connected to the cathodes of the first rectifying diode and the second rectifying diode.

In accordance with one aspect of the present disclosure, a direct current (DC)-DC converter, which converts first voltage output by a first battery to a second voltage output by a second battery, may include a transformer. The transformer includes a primary coil connected to the first battery, and a secondary coil connected to the second battery. The transformer is configured to transform the first voltage to the second voltage. The DC-DC converter also includes at least one switch configured to control first current input to the transformer from the first battery, at least one rectifying diode configured to rectify alternate current (AC) output from the transformer, and a snubber circuit configured to prevent overvoltage from being applied to the at least one rectifying diode.

The snubber circuit may include a plurality of diodes connected in series to one another, an inductor connected in series to the plurality of diodes, and at least one capacitor connected in parallel with the plurality of diodes.

The plurality of diodes may include a first diode, a second diode, and a third diode connected in series to one another. The at least one capacitor may include a first capacitor connected in parallel with the first diode and the second diode, and a second capacitor connected in parallel with the second diode and the third diode.

The first capacitor and the second capacitor may be connected in series via the second diode while a voltage applied to the at least one rectifying diode is increasing.

The first capacitor and the second capacitor may be connected in parallel via the first diode and the third diode while a voltage applied to the at least one rectifying diode is decreasing.

The transformer may include a primary coil configured to receive the first current and a secondary coil configured to induce second current according to a magnetic field produced by the primary coil. The secondary coil may be divided by a center tap into first and second coils.

The at least one rectifying diode may include a first rectifying diode with an anode connected to the first coil of the secondary coil, and a second rectifying diode with an anode connected to the second coil of the secondary coil. Cathodes of the first rectifying diode and the second rectifying diode may be connected to each other.

The snubber circuit may have one end connected to the center tap of the secondary coil and the other end connected to the cathodes of the first rectifying diode and the second rectifying diode.

The transformer may include a primary coil configured to receive the first current, and a secondary coil configured to induce second current according to a magnetic field produced by the primary coil.

The at least one rectifying diode may include a first rectifying diode with an anode connected to an end of the secondary coil, and a second rectifying diode with an anode connected to the other end of the secondary coil. Cathodes of the first rectifying diode and the second rectifying diode may be connected to each other.

The snubber circuit may have one end connected to the other end of the secondary coil and the other end connected to the cathodes of the first and second rectifying diodes.

BRIEF DESCRIPTION OF THE DRAWINGS

The above and other objects, features and advantages of the present disclosure will become more apparent to those of ordinary skill in the art by describing in detail example embodiments thereof with reference to the accompanying drawings, in which.

DETAILED DESCRIPTION

Figure 1:
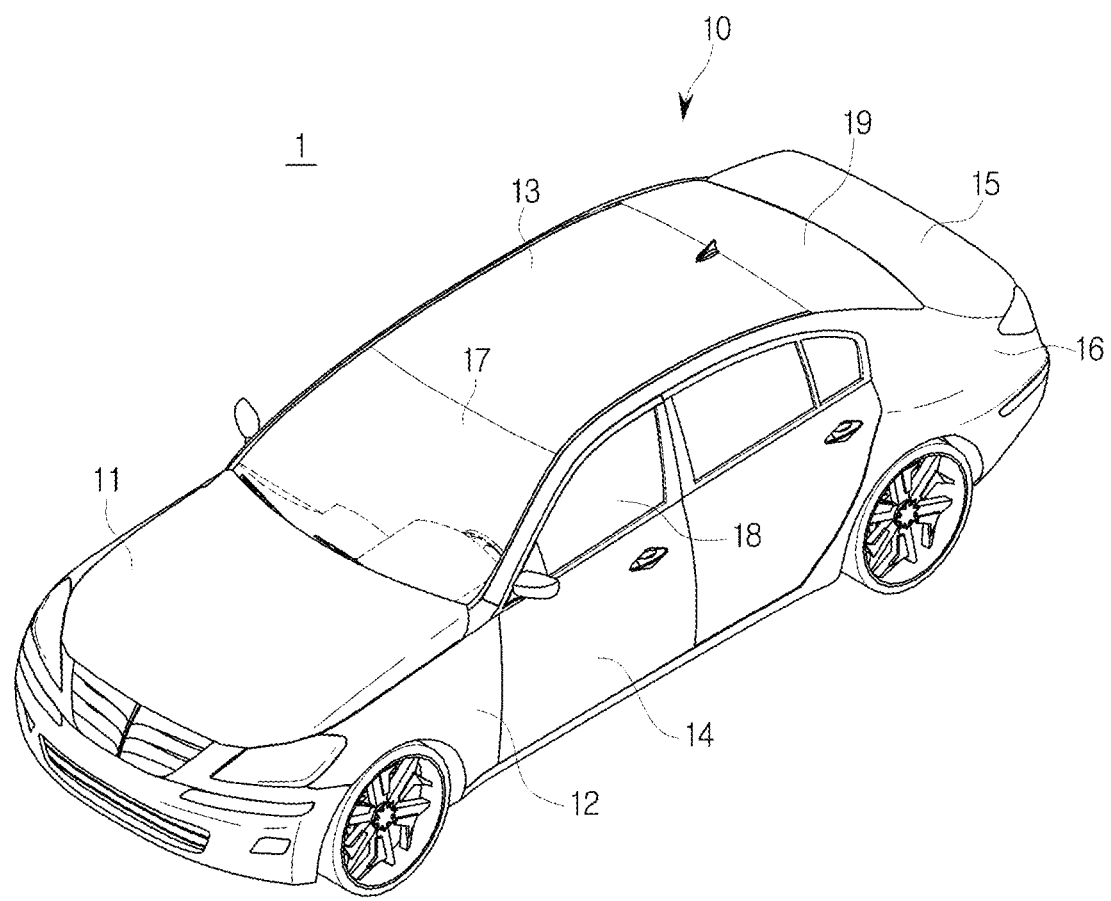
FIG. 1 shows an example of a car body, according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, embodiments will now be described more fully hereinafter with reference to the accompanying drawings. The disclosed embodiments may, however, be embodied in many different forms and should not be construed as being limited to the embodiments set forth herein. These embodiments are provided so that this disclosure will be thorough and complete and will fully convey the disclosed embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

When an element is referred to as being "connected," or "coupled," to another element, the element may be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting. As used herein, the singular forms "a," "an," and "the" are intended to include the plural forms as well, unless the context clearly indicates otherwise.

Reference will now be made in detail to the embodiments of the present disclosure, examples of which are illustrated in the accompanying drawings. Like reference numerals refer to like elements throughout.

A vehicle 1 is a mechanical/electric machine for carrying humans and/or goods based on rotary power of a combustion engine and/or turning force of an electric motor.

The vehicle 1 with the combustion engine may explosively burn fossil fuel, such as gasoline, diesel, gas, etc., convert translation power generated during the combustion of the fossil fuel to rotary power, and be moved by the converted rotary power.

The vehicle 1 using the electric motor is called an electric vehicle (EV), and may be moved with rotary power, which is rotary motion energy converted from electric energy stored in a battery.

The vehicle 1 using both the combustion engine and the electric motor is called a hybrid electric vehicle (HEV) and may be moved not only using the combustion engine but also using the electric motor. The HEVs may be classified into common HEVs for receiving only fossil fuel from the outside and generating electric energy using the combustion engine and electric motor (generator), and plug-in HEVs (PHEVs) for receiving both the fossil fuel and electric energy from the outside.

It is common for the EVs and HEVs to include a battery for supplying electric energy to the electric driving motor and a battery for supplying electric energy to electric parts of the vehicle 1. For example, the battery for supplying electric energy to the electric driving motor may have an output voltage of about hundreds of volts (V), and the battery for supplying electric energy to the electric parts may have an output voltage of about tens of volts.

The EVs charge a battery for the electric driving motor from an external power source, and charge a battery for the electric parts by converting the voltage of the battery for the electric driving motor. The HEVs also charge a battery for the electric driving motor using the combustion engine, and charge a battery for electric parts by converting the voltage of the battery for the electric driving motor.

Accordingly, the EVs and HEVs may include a direct current (DC)-DC converter for converting voltage of hundreds of volts for charging the battery for the electric driving motor to a voltage of tens of volts for charging the battery for the electric parts.

The vehicle 1 and DC-DC converter included in the vehicle 1 will now be described in detail.

Figure 2:
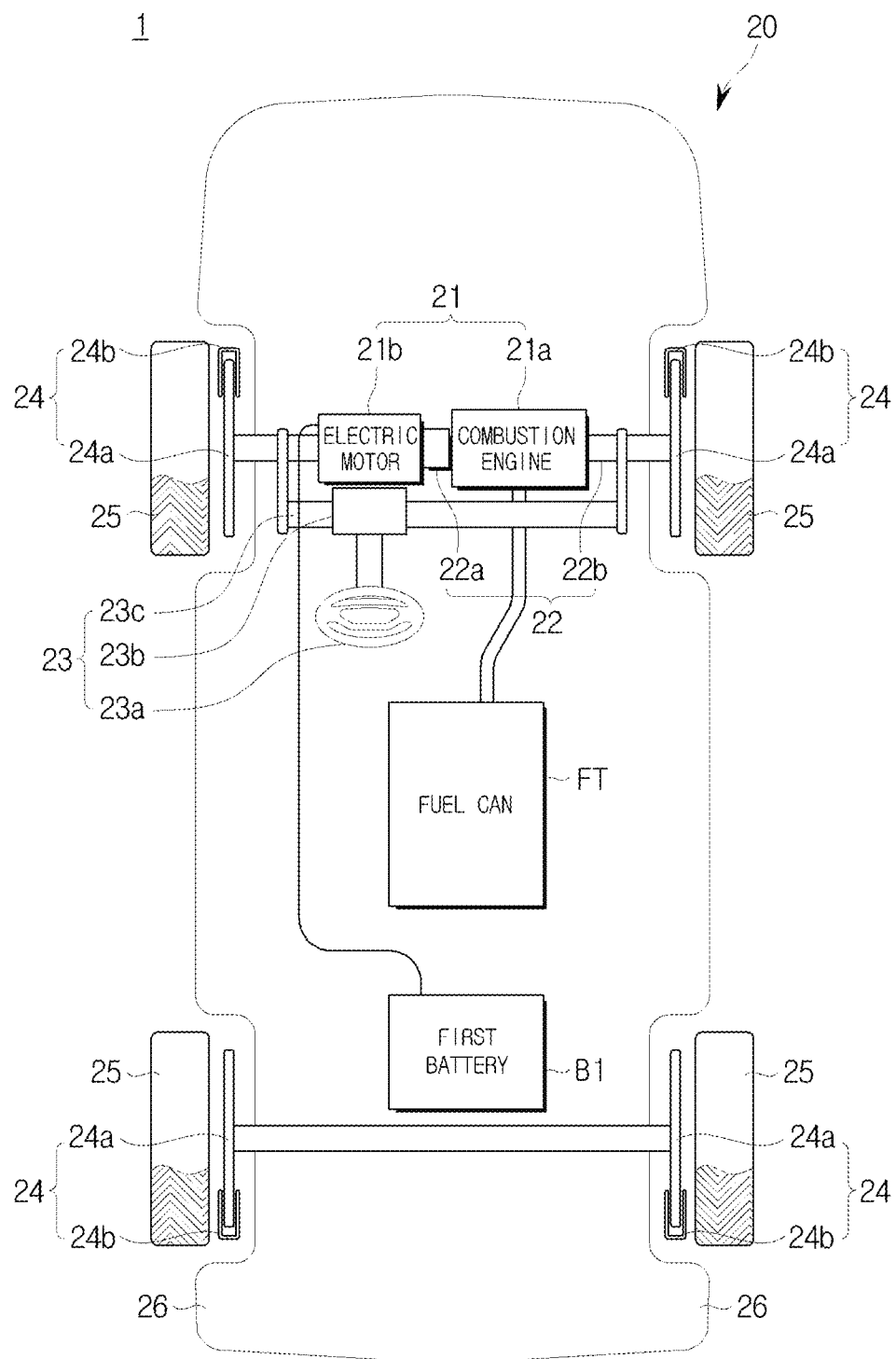
FIG. 2 shows an example of a chassis of a vehicle, according to an embodiment of the present disclosure.
Figure 3:
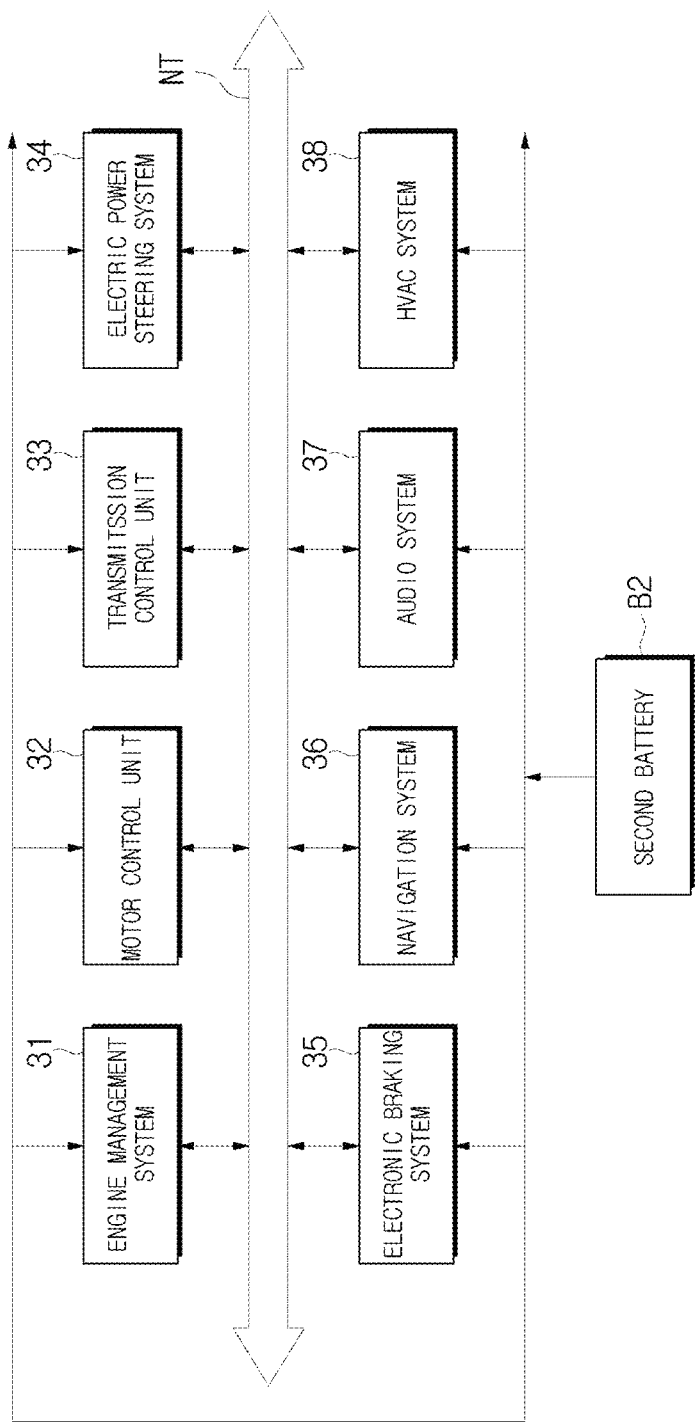
FIG. 3 shows an example of electric parts of a vehicle, according to an embodiment of the present disclosure.
Figure 4:
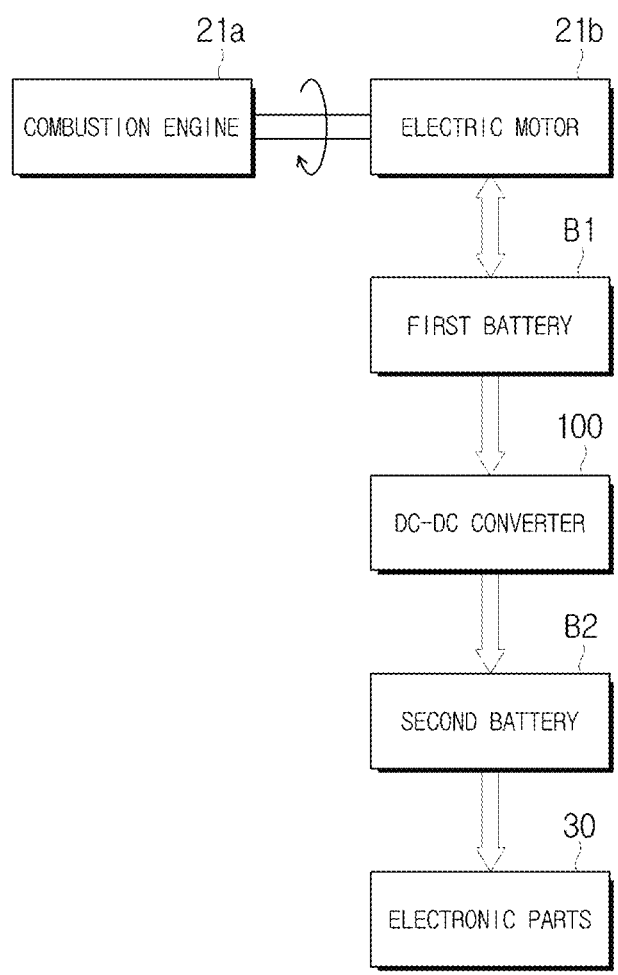
FIG. 4 shows an example of a power system of a vehicle, according to an embodiment of the present disclosure.

FIG. 1 shows a car body, according to an embodiment of the present disclosure. FIG. 2 shows a chassis of a vehicle, according to an embodiment of the present disclosure. FIG. 3 shows electric parts of a vehicle, according to an embodiment of the present disclosure. FIG. 4 shows a power system of a vehicle, according to an embodiment of the present disclosure.

Referring to FIGS. 1 to 4, the vehicle 1 may include a car body 10 forming an exterior of the vehicle 1 and accommodating the driver and/or luggage. The vehicle 1 also includes a chassis 20 including a power generator, a power deliverer, a brake system, a steering system, wheels, etc., other than the car body 10, and electric parts 30 for protecting the driver and giving convenience to the driver.

As shown in FIG. 1, the chassis 20 forms an interior space, in which the driver may stay, a combustion engine room for accommodating a combustion engine, and a trunk room for accommodating luggage.

The car body 20 may include a hood 11, front fenders 12, a roof panel 13, doors 14, a trunk lid 15, quarter panels 16, etc. To help the driver see views, there may be a front window 17 installed on a front side of the car body 10, side windows 18 installed on sides of the car body 10, and a rear window 19 installed on a rear side of the car body 10.

As shown in FIG. 2, the chassis 20 may include a power generator 21, a power deliverer 22, a steering system 23, a braking system 24, wheels 25, etc., to drive the vehicle 1 under the control of the driver and/or a autonomous driving system. The chassis 20 may further include a frame 26 to fix the power generator 21, power deliverer 22, steering system 23, braking system 24, and wheels 25.

The power generator 21 may generate rotary power to drive the vehicle 1, and includes a combustion engine 21a, a fuel supply system, an exhaust system, an electric motor 21b, a first battery B1, etc.

The power deliverer 22 may deliver the rotary power generated by the power generator 21 to the wheels 25, and includes a clutch/transmission 22a, a transmission lever, a differential gear, a driving shaft 22b, etc.

The steering system 23 may control a traveling direction of the vehicle 1, and includes a steering wheel 23a, a steering gear 23b, a steering link 23c, etc.

The braking system 24 may stop rotation of the wheels 25, and may include a brake pedal, a master cylinder, a brake disc 24a, a brake pad 24b, etc.

The wheels 25 may move the vehicle 1 by receiving rotary power from the power generator 21 through the power deliverer 22. The wheels 25 may include front wheels equipped in the front direction of the vehicle 1 and rear wheels equipped in the rear direction of the vehicle 1.

The vehicle 1 may include various electric parts 30 for controlling the vehicle 1 and giving safety and comfort to the driver and passenger, as well as the aforementioned mechanical parts.

As shown in FIG. 3, the vehicle 1 may include an engine management system 31, a motor control unit 32, a transmission control unit 33, an electric power steering system 34, an electronic braking system 35, a navigation system 36, an audio system 37, and a heating/ventilation/air conditioning (HVAC) system 38.

The electric parts 30 may communicate to one another through a vehicle communication network (NT). For example, the electric parts 30 may exchange data over Ethernet, Media Oriented Systems Transport (MOST), Flexray, Controller Area Network (CAN), Local Interconnect Network (LIN), etc.

The electric parts 30 may also receive power from a second battery B2.

The second battery B2 may be arranged separately from the first battery B1, as shown in FIG. 2.

For example, as shown in FIG. 4, the first battery B1 may supply power to the electric motor 21b to drive the vehicle 1, and may output a voltage of hundreds of volts (V) (e.g., from about 200V to about 800V) to supply power to the electric motor 21b. The second battery B2 may supply power to the electric parts 30 and may output a voltage of tens of volts (V) (e.g., from about 12V to about 24V) to supply power to the electric parts 30. In other words, the first battery B1 and the second battery B2 may be separately arranged to supply power to the electric motor 21b and the electric parts 30, respectively, which operate with power at different voltages.

The first battery B1 may not only supply power to the electric motor 21b but also be charged by the electric motor 21b.

For example, while the vehicle 1 is moving down the slope, the vehicle 1 may be driven by the gravity and/or inertia, and rotary power of the wheels 25 may be delivered to the electric motor 21b through the power deliverer 22. The electric motor 21b may generate electric energy from the rotary power delivered from the wheels 25, and the electric energy generated by the electric power 21b may be stored in the first battery B1.

In another example, if the driver stops the vehicle 1 or decreases the speed of the vehicle 1, the electric motor 21b may generate regenerative braking force to slow down the vehicle 1 and generate electric energy by regenerative braking. The electric energy generated by the electric motor 21b may be stored in the first battery B1.

In this way, the first battery B1 may receive electric energy from the electric motor 21b. The second battery B2 may receive electric energy from the first battery B1 through the DC-DC converter 100.

As described above, the output voltage of the second battery B2 is different than an output voltage of the first battery B1. Accordingly, the DC-DC converter 100 for converting the output voltage of the first battery B1 to the output voltage of the second battery B2 may exist to charge the second battery B2.

The DC-DC converter 100 may convert a first voltage output by the first battery B1 to a second voltage output by the second battery B2. Electric energy at the second voltage converted by the DC-DC converter 100 may be stored in the second battery B1.

Configuration and operation of the DC-DC converter 100 will now be described.

Figure 5:
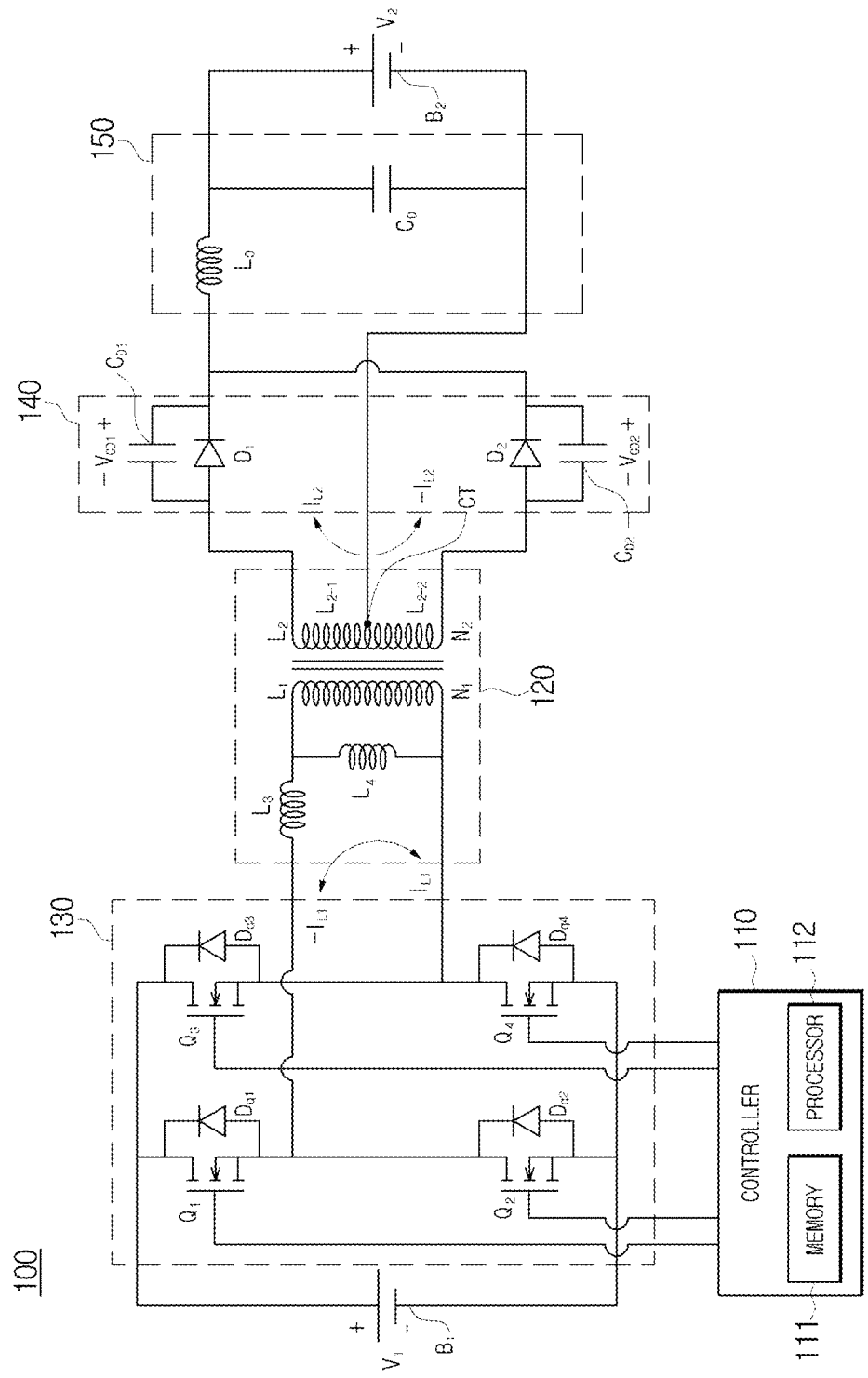
FIG. 5 is an example of a DC-DC converter, according to an embodiment of the present disclosure.

FIG. 5 is an example of a DC-DC converter, according to an embodiment of the present disclosure.

As shown in FIG. 5, the DC-DC converter 100 may be arranged between the first battery B1 to output the first voltage V1 and the second battery B2 to output the second voltage V2, for receiving the first voltage V1 and outputting the second voltage V2.

The DC-DC converter 100 may include a transformer 120, a driving circuit 130, a rectifying circuit 140, an output circuit 150, and a controller 110.

The transformer 120 may change a value of alternate current (AC) voltage and/or a value of AC current using electromagnetic induction.

The transformer 120 may include a primary coil L1 on a input side, a secondary coil L2 on an output side, a center tap (CT) arranged in a center of the secondary coil L2, and an iron core for transferring a magnetic field from the primary coil L1 to the secondary coil L2. A time-varying magnetic field may be produced around the iron core according to an AC voltage and an AC current input to the primary coil L1, and an AC voltage and an AC current may be produced in the secondary coil L2 according to the magnetic field around the iron core.

The secondary coil L2 may be divided into a first coil L2-1 and a second coil L2-2 by the center tap CT. The center tap CT may be located in the center of the secondary coil L2, and a number of turns of the first coil L2-1 may be the same as the number of turns of the second coil L2-2. This type of transformer is called a center-tap transformer. In this way, the transformer 120 including the center tap CT may perform full wave rectification on the AC voltage and AC current output from the secondary coil L2 with a rectifying circuit 120, as will be described below. The full wave rectification by the first coil L2-1 and the second coil L2-2 will be described in more detail below.

An output voltage output by the secondary coil L2 may be calculated in the following equation 1:

$$V_{out} = \frac{N_2/2}{N_1} V_{in}, \quad (1)$$

where Vout represents an output voltage of the secondary coil, Vin represents an input voltage of the primary coil, N2 represents the number of turns of the secondary coil, and N1 represents the number of turns of the primary coil.

According to the Equation 1, the output voltage Vout of the secondary coil L2 may be proportional to the input voltage Vin of the primary coil L1, and a ratio of the number of turns N2 of the secondary coil L2 may be proportional to the number of turns N1 of the primary coil L1.

While an ideal transformer is assumed to have the input power (e.g., voltage and current) equal to the output power, an actual transformer has output power different from the input power because of a loss in, for example, the iron core. Such a loss of an actual transformer may be represented by leakage inductance. For more correct modeling, the transformer 120 may further include a leakage inductor L3 to represent the leakage inductance.

While the ideal transformer is assumed to deliver a magnetic field produced by the primary coil L2 fully to the secondary coil L2, the actual transformer has some of the magnetic field produced by the primary coil L1 remain in the primary coil L1. The component remaining in the primary coil L2 may be represented as magnetizing inductance. For more correct modeling, the transformer 120 may further include a magnetizing inductor L4 to represent the magnetizing inductance.

The driving circuit 130 may be connected to the primary coil L1 of the transformer 120.

The first battery B1 may output DC voltage and DC current, and the transformer 120 may convert AC voltage and AC current. Accordingly, the driving circuit 130 may pass or cut off the DC current output from the first battery B1 to input an AC current to the transformer 120, and may supply a time-varying AC current to the primary coil L1 of the transformer 120.

The driving circuit 130 may include a plurality of driving switches Q1, Q2, Q3, and Q4.

For example, the driving circuit 130 may include a first driving switch Q1, a second driving switch Q2, a third driving switch Q3, and a fourth driving switch Q4 (e.g., first to fourth driving switches Q1 to Q4), and the first to fourth driving switches Q1 to Q4 may be arranged in a full bridge form.

The first driving switch Q1 and the second driving switch Q2 may be connected in series between positive and negative electrodes of the first battery B1, and the third driving switch Q3 and the fourth driving switch Q4 may be connected in series between the positive and negative electrodes of the first battery B1. The pair of the first driving switch Q1 and the second driving switch Q2 and the pair of the third driving switch Q3 and the fourth driving switch Q4 may be connected in parallel to each other.

A node at which the first driving switch Q1 and the second driving switch Q2 are connected may be connected to an end of the primary coil L1 of the transformer 120, and a node at which the third driving switch Q3 and the fourth driving switch Q4 are connected may be connected to the other end of the primary coil L1.

The first to fourth driving switches Q1 to Q4 may include first to fourth freewheeling diodes Dq1 to Dq4, respectively, to protect the first to fourth driving switches Q1 to Q4 against a reverse voltage due to the inductance of the primary coil L1. The first to fourth freewheeling diodes Dq1 to Dq4 may be connected in parallel to the first to fourth driving switches Q1 to Q4, respectively.

The first to fourth driving switches Q1 to Q4 may be opened/closed individually according to a driving signal of the controller 110, and a time-varying current may be applied to the primary coil L1 of the transformer 120 according to the open/close operation of the first to fourth driving switches Q1 to Q4. For example, if the first and fourth driving switches Q1 and Q4 are turned on, forward current IL1 may be applied to the primary coil L1, and if the second driving switch Q2 and the third driving switch Q3 are turned on, reverse current −IL1 may be applied to the primary coil L1.

Each of the first to fourth driving switches Q1 to Q4 may have various structures and materials. For example, the first to fourth driving switches Q1 to Q4 may each employ a bipolar junction transistor BJT, a metal-oxide-semiconductor field effect transistor (MOSFET), insulated gate bipolar transistor (IGBT), or the like. The first to fourth driving switches Q1 to Q4 may each be formed of a semiconductor material, such as silicon Si, silicon carbide SiC, or gallium arsenide GaAS.

The rectifying circuit 140 may convert the AC current output from the transformer 120 to a DC current.

As described above, the transformer 120 may change a value of AC voltage and/or AC current, receive AC voltage and AC current, and output AC voltage and AC current with a changed magnitude. The rectifying circuit 140 may convert the AC voltage and AC current output from the transformer 120 to a DC voltage and DC current.

The rectifying circuit 140 may include a first rectifying diode D1 for rectifying an output current of the first coil L2-1 of the secondary coil L2 of the transformer 120, and a second rectifying diode D2 for rectifying an output current of the second coil L2-2.

The current output from the secondary coil L2 of the transformer 120 may change according to a direction of the current input to the primary coil L1. For example, if the forward current IL1 is input to the primary coil L1, a forward current IL2 may flow in the secondary coil L2, and if the reverse current −IL1 is input to the primary coil L1, a reverse current −IL2 may flow in the secondary coil L2.

The first rectifying diode D1 may pass the forward current IL2 but block the reverse current −IL2 output from the secondary coil L2. The second rectifying diode D2 may block the forward current IL2 but pass the reverse current −IL2 output from the secondary coil L2.

In other words, if the forward current IL2 is produced in the first coil L2-1 and the second coil L2-2 by the current of the primary coil L1, the first rectifying diode D1 may allow the forward current IL2 of the first coil L2-1 and the second rectifying diode D2 may block the forward current IL2 of the second coil L2-2. If the reverse current −IL2 is produced in the first coil L2-1 and the second coil L2-2, the first rectifying diode D1 may block the reverse current −IL2 of the first coil L2-1 and the second rectifying diode D2 may allow the reverse current −IL2 of the second coil L2-2.

As a result, the first rectifying diode D1 and the second rectifying diode D2 may rectify the AC current output from the secondary coil L2 of the transformer 120 to output a DC current to the second battery B2.

The first rectifying diode D1 and the second rectifying diode D2 may include a first parasitic capacitor Cd1 and a second parasitic capacitor Cd2, respectively, due to structural characteristics. A diode is manufactured by a junction of p-type semiconductor and n-type semiconductor, which causes parasitic capacitance. Such parasitic capacitance may be modeled with the first parasitic capacitor Cd1 and/or the second parasitic capacitor Cd2.

The first parasitic capacitor Cd1 and the second parasitic capacitor Cd2 may be connected in parallel with the first rectifying diode D1 and the second rectifying diode D2, respectively.

An output circuit 150 may filter out ripples of the DC current and DC voltage rectified by the rectifying circuit 140.

The output circuit 150 may have the form of a low pass filter including an output inductor Lo and an output capacitor Co. The output inductor Lo may filter out ripples of the DC current output from the rectifying circuit 140, and the output capacitor Co may filter out ripples of the DC voltage output from the rectifying circuit 140.

The controller 110 may control operation of the DC-DC converter 100, and may include a memory 111 and a processor 112.

The memory 111 may store a control program and control data for controlling the operation of the DC-DC converter 100. For example, the memory 111 may include a volatile memory, such as a static random access memory (SRAM), a dynamic RAM (DRAM), or the like, which may temporarily store data. The memory 111 may also include a non-volatile memory, such as a Read Only Memory (ROM), an Erasable Programmable ROM (EPROM), an Electrically Erasable Programmable ROM (EEPROM), flash memory, or the like, which may permanently store a control program and/or control data.

The processor 112 may include various logic circuits and operation circuits that process data under a program provided from the memory 112 and generate a control signal according to the result of the process. For example, the processor 112 may generate driving signals to individually open/close the first to fourth driving switches Q1 to Q4 of the driving circuit 130 based on the first voltage V1 of the first battery B1 and the second voltage V2 of the second battery B2.

The memory 111 and the processor 112 may be implemented in separate integrated circuits (ICs) or implemented integrally in a single IC.

As such, the controller 110 may control the operation of the driving circuit 130 based on the values of the first and second voltages V1 and V2.

Detailed operation of the controller 110 will be described below along with the operation of the DC-DC converter 100.

Figure 6:
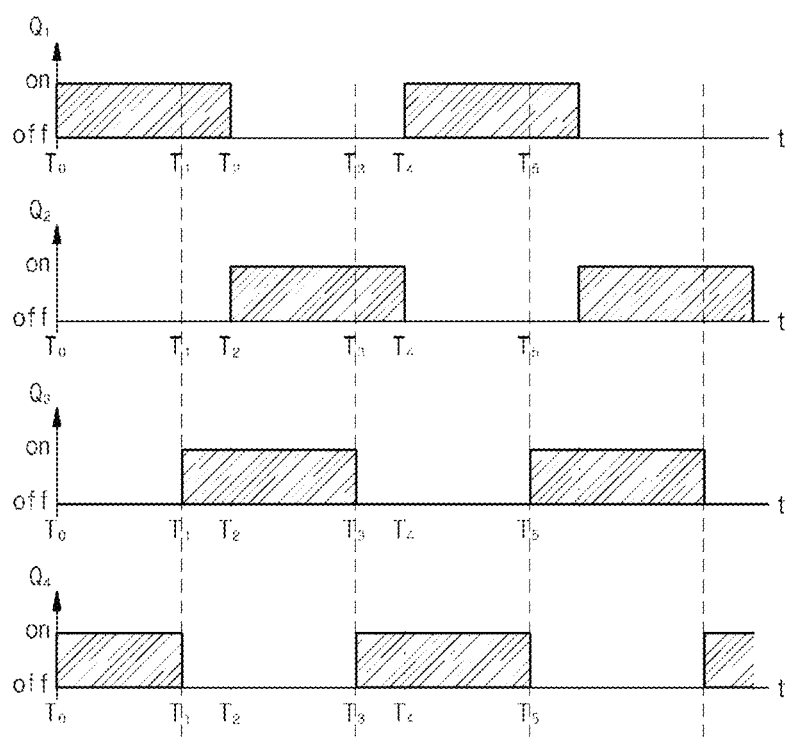
FIG. 6 shows an example of driving signals of a controller included in a DC-DC converter, according to an embodiment of the present disclosure.
Figure 7:
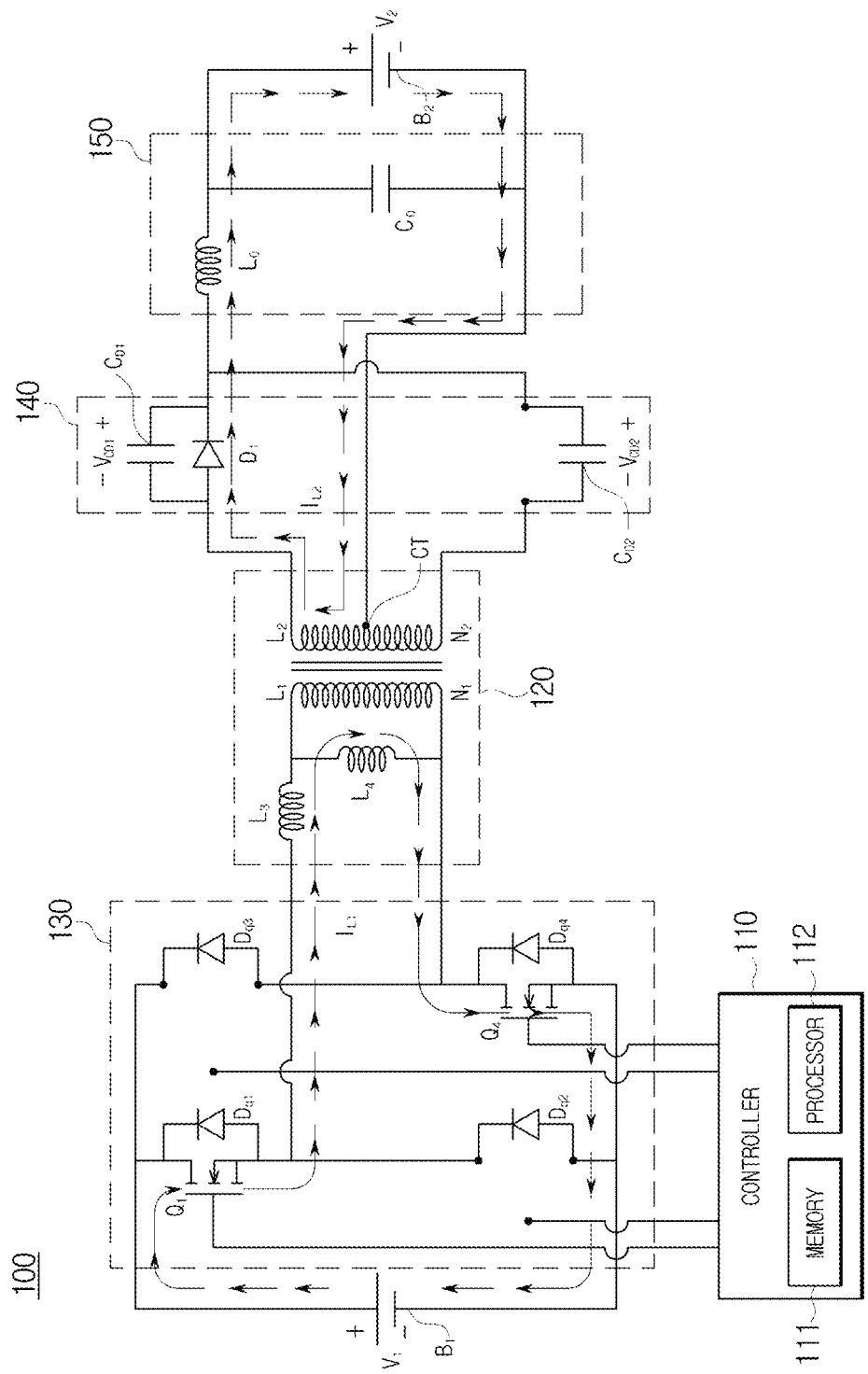
FIGS. 7 and 8 show an example of operation of the DC-DC converter shown in FIG. 5.
Figure 8:
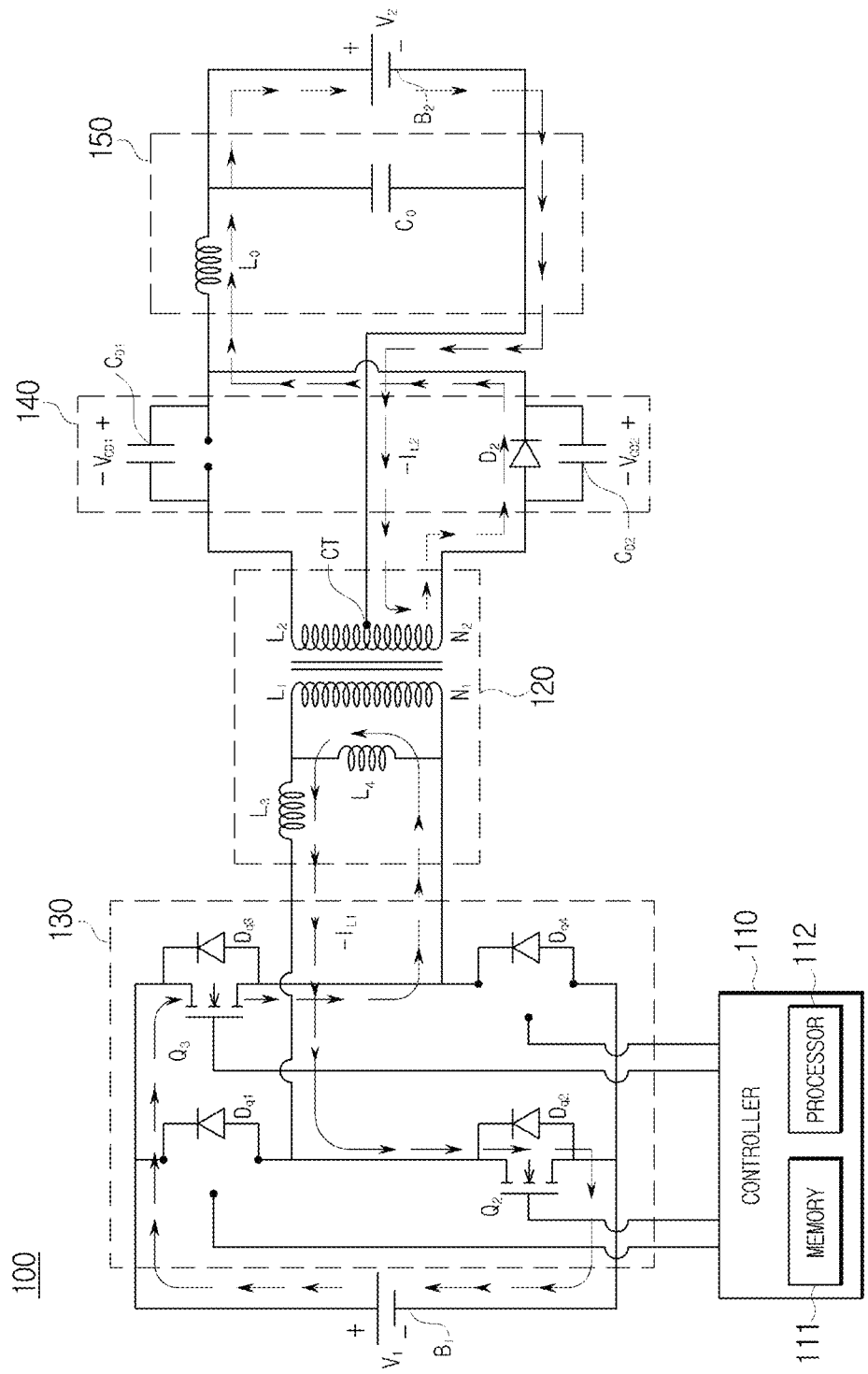
Figure 9:
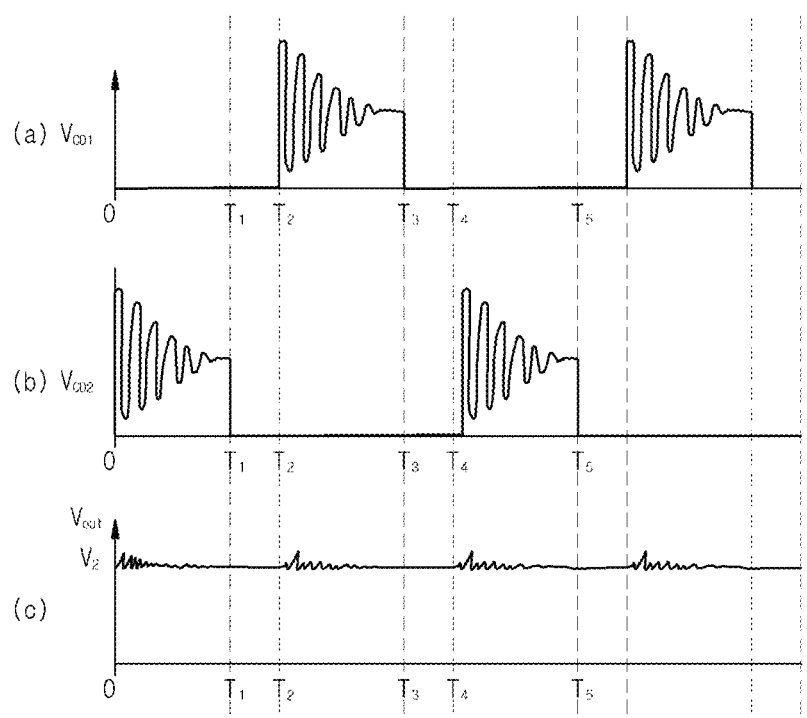
FIG. 9 shows an example of voltages applied to the rectifying circuit of the DC-DC converter shown in FIG. 5 and an output voltage therefrom.

FIG. 6 shows an example of driving signals of a controller included in a DC-DC converter, according to an embodiment of the present disclosure. FIGS. 7 and 8 show an example of operation of the DC-DC converter shown in FIG. 5. FIG. 9 shows an example of voltages applied to the rectifying circuit of the DC-DC converter shown in FIG. 5 and an output voltage therefrom.

As described above, the controller 110 may generate driving signals to control operation of the driving circuit 130 based on the values of the first and second voltages V1 and V2, and output the driving signals individually to the first to fourth driving switches Q1 to Q4 of the driving circuit 130.

For example, the controller 110 may output driving signals, as shown in FIG. 6. The first to fourth driving switches Q1 to Q4 may be individually opened/closed (e.g., turned on/off; cycles under the driving signals from the controller 110). For example, the first to fourth driving switches Q1 to Q4 may each be turned on/off at 200 Kilo Hertz (kHz).

The first driving switch Q1 may be turned on at a time T0, then off at a time T2, and back on at a time T4. The second driving switch Q2, on the contrary to the first driving switch Q1, may be turned off at T0, then on at T2, and back off at T4. In this way, alternately turning on/off the first driving switch Q1 and the second driving switch Q2 may prevent a driving current from passing the first driving switch Q1 and the second driving switch Q2 simultaneously.

The third driving switch Q3 may be turned on at a time T1, then off at a time T3, and back on at a time T5. The fourth driving switch Q4, on the contrary to the third driving switch Q3, may be turned off at T1, then on at T3, and back off at T5. In this way, alternately turning on/off the third driving switch Q3 and the fourth driving switch Q4 may prevent a driving current from passing the third driving switch Q3 and the fourth driving switch Q4 simultaneously.

During a period of time when both the first driving switch Q1 and the fourth driving switch Q4 are turned on, the forward current IL1 may be applied to the primary coil L1 of the transformer 120, as shown in FIG. 7. The forward current IL1 flows from the positive electrode of the first battery B1 to the negative electrode of the second battery B2 through the first driving switch Q1, the primary coil L1, and the fourth driving switch Q4.

The forward current IL1 of the primary coil L1 may induce the forward current IL2 in the secondary coil L2, which may be applied to the second battery B2 through the first rectifying diode D1 of the rectifying circuit 140 and the output circuit 150.

According to what is shown in FIG. 6, there is a little difference in time between when the first driving switch Q1 is turned on and when the fourth driving switch Q4 is turned on. Due to the difference in time of being turned on between the first driving switch Q1 and the fourth driving switch Q4, current to be supplied from the first battery B1 to the second battery B2 through the transformer 120 may be adjusted.

In other words, based on a ratio of the time of the first driving switch Q1 and the fourth driving switch Q4 being turned on simultaneously to an open/close period of the first driving switch Q1 and the fourth driving switch Q4, the current to be supplied from the first battery B1 to the second battery B2 may be controlled and the voltage of the second battery B2 may also be controlled.

During a period of time when both the second driving switch Q2 and the third driving switch Q3 are turned on, the inverse current –IL1 may be applied to the primary coil L1 of the transformer 120, as shown in FIG. 8, and the reverse current –IL1 flows from the positive electrode of the first battery B1 to the negative electrode of the second battery B2 through the third driving switch Q3, the primary coil L1, and the second driving switch Q2.

The inverse current –IL1 of the primary coil L1 may induce the reverse current –IL2 in the secondary coil L2, which may be applied to the second battery B2 through the second rectifying diode D2 of the rectifying circuit 140 and the output circuit 150.

A time when the second driving switch Q2 is turned on and a time when the third driving switch Q3 is turned on are not identical, and due to the difference in time of being turned on between the second driving switch Q2 and the third driving switch Q3, current to be supplied from the first battery B1 to the second battery B2 through the transformer 120 may be controlled.

In other words, based on a ratio of the time of the first driving switch Q1 and the fourth driving switch Q4 being turned on simultaneously to an open/close period of the first driving switch Q1 and the fourth driving switch Q4, the current to be supplied from the first battery B1 to the second battery B2 may be controlled and the voltage of the second battery B2 may also be controlled.

Based on a ratio of the time of the second driving switch Q2 and third driving switch Q3 being turned on simultaneously to an open/close period of the second driving switch Q2 and the third driving switch Q3, the current to be supplied from the first battery B1 to the second battery B2 may be controlled and the voltage of the second battery B2 may also be controlled.

The ratio of time of the forward current IL1 or reverse current –IL1 being supplied through the driving switch Q1, Q2, Q3, Q4 to an open/close period of the driving switch Q1, Q2, Q3, Q4 is termed as a duty cycle, based on which the voltage of the second battery B2 may be controlled.

As described above, since the first to fourth driving switches Q1 to Q4 are arranged in the form of a full bridge, and the output voltage is controlled using a phase difference of opening/closing the first to fourth driving switches Q1 to Q4, the DC-DC converter 100 is called a Phase Shift Full Bridge (PSFB) converter.

The first rectifying diode D1 of the rectifying circuit 140 may block the reverse current –IL2 of the first coil L2-1, and the second rectifying diode D2 may block the forward current IL2 of the second coil L2-2.

While the first rectifying diode D1 is blocking the reverse current –IL2 of the first coil L2-1, the second voltage V2 of the second battery B2 may be applied to the first rectifying diode D1. Accordingly, for safe operation, a diode that may endure a voltage twice the second voltage V2 may be selected as the first rectifying diode D1. For example, if the second voltage is about 12V, the enduring voltage of the first rectifying diode D1 may be about 25V.

In this case, overvoltage may be applied to the first rectifying diode D1 due to a ringing effect. The ringing effect is a phenomenon in which a voltage applied to a switch oscillates by exceeding a supply voltage during switching operation (e.g., open/close operation) of the switch, and is known to be caused by resonance between the parasitic inductance and parasitic capacitance of the switch.

Specifically, during open/close operation of the first to fourth switches Q1 to Q4, resonance occurs between a leakage inductor L3 of the transformer 120 and a first parasitic capacitor Cd1 of the first rectifying diode D1, and due to the resonance between the leakage inductor L3 and the first parasitic capacitor Cd1, a voltage applied to the first rectifying diode D1 may oscillate as shown in (a) of FIG. 9, and the oscillation of the voltage may cause overvoltage to be applied to the first rectifying diode D1. The overvoltage may damage the first rectifying diode D1.

Due to resonance between the leakage inductor L3 and a second parasitic capacitor Cd2, the voltage applied to the second rectifying diode D2 may oscillate, as shown in (b) of FIG. 9, and due to the oscillation, overvoltage may be applied to the first rectifying diode D1. The overvoltage may damage the second rectifying diode D2.

Due to the ringing effect in the first rectifying diode D and the second rectifying diode D2, an output voltage Vout output from the DC-DC converter 100 may have ripples, as shown in (c) of FIG. 9.

A DC-DC converter able to minimize the ringing effect in the first rectifying diode D1 and the second rectifying diode D2 will now be described.

Figure 10:
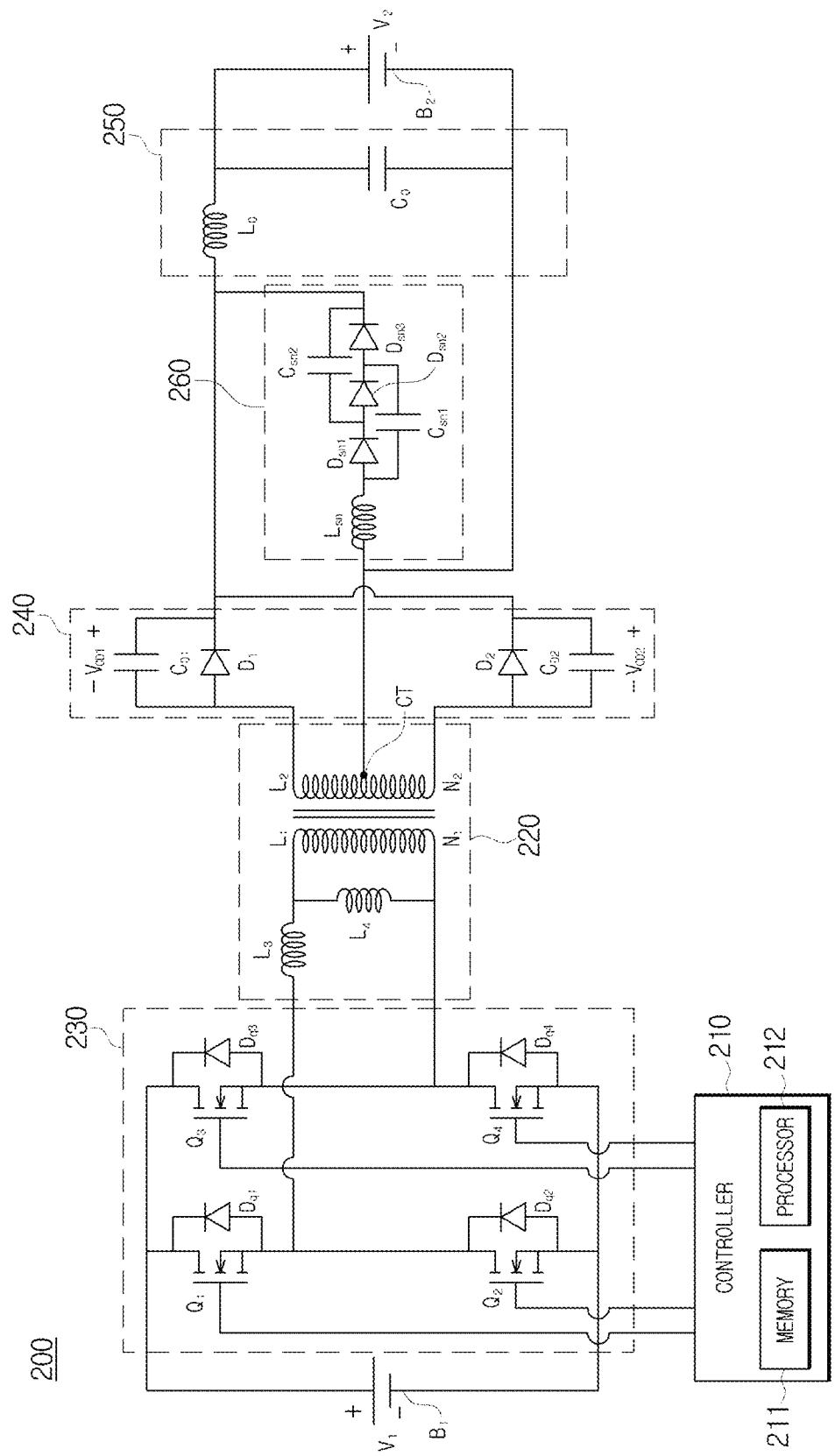
FIG. 10 shows another example of a DC-DC converter, according to an embodiment of the present disclosure.

FIG. 10 is another example of a DC-DC converter, according to an embodiment of the present disclosure. Referring to FIG. 10, a DC-DC converter 200 may include a transformer 220, a driving circuit 230, a rectifying circuit 240, an output circuit 250, an inductive/capacitive snubber circuit 260, and a controller 210.

The transformer 220, the driving circuit 230, the rectifying circuit 240, the output circuit 250, and the controller 210 may be the same as the transformer 120, the driving circuit 130, the rectifying circuit 140, the output circuit 150, and the controller 110.

The snubber circuit 260 may be connected in parallel with the first rectifying diode D1 and the second rectifying diode D2. Specifically, an end of the snubber circuit 260 may be connected to cathodes of the first rectifying diode D1 and the second rectifying diode D2, and the other end of the snubber circuit 260 may be connected to the center tab CT of the transformer 220.

The snubber circuit 260 may include a first snubber diode Dsn1, a second snubber diode Dsn2, and a third snubber diode Dsn3 (e.g., first to third snubber diodes Dsn1 to Dsn3), a first snubber capacitor Csn1 and a second snubber capacitor Csn2, and a snubber inductor Lsn.

The first to third snubber diodes Dsn1 to Dsn3 may be connected in series between the cathodes of the first rectifying diode D1 and the second rectifying diode D2 and the center tap CT of the transformer 22. Specifically, the cathode of the third snubber diode Dsn3 may be connected to the cathodes of the first rectifying diode D1 and the second rectifying diode D2. The cathode of the second snubber diode Dsn2 may be connected to the anode of the third snubber diode Dsn3. The cathode of the first snubber diode Dsn1 may be connected to the anode of the second snubber diode Dsn2.

The snubber inductor Lsn may be connected in series with the first to third snubber diodes Dsn1 to Dsn3. An end of the snubber inductor Lsn may be connected to the anode of the first snubber diode Dsn1, and the other end of the snubber inductor Lsn may be connected to the center tab CT of the transformer 220.

The first snubber capacitor Csn1 and the second snubber capacitor Csn2 may each be connected in parallel with some of the first to third snubber diodes Dsn1 to Dsn3.

The first snubber capacitor Csn1 may be connected in parallel with the first snubber diode Dsn1 and the second snubber diode Dsn2. Specifically, an end of the first snubber capacitor Csn1 may be connected to the anode of the first snubber diode Dsn1, and the other end of the first snubber capacitor Csn1 may be connected to the cathode of the second snubber diode Dsn2.

The second snubber capacitor Csn2 may be connected in parallel with the second snubber diode Dsn2 and the third snubber diode Dsn3. Specifically, an end of the second snubber capacitor Csn2 may be connected to the anode of the second snubber diode Dsn2, and the other end of the second snubber capacitor Csn2 may be connected to the cathode of the third snubber diode Dsn3.

The snubber circuit 260 may prevent a rapid change in voltage to be applied to the first rectifying diode D1 and the second rectifying diode D2 and/or in current to be supplied to the parasitic capacitors Cd1 and Cd2 of the first rectifying diode D1 and the second rectifying diode D2.

The first snubber capacitor Csn1 and the second snubber capacitor Csn2 may prevent a rapid change in voltage to be applied to the first rectifying diode D1 and the second rectifying diode D2.

A wiring form of the first snubber capacitor Csn1 and the second snubber capacitor Csn2 may be changed according to the voltage applied to the snubber circuit 260 because of the first snubber diode Dsn1, the second snubber diode Dsn2, and the third snubber diode Dsn3. For example, if a positive voltage is applied to the snubber circuit 260, the first snubber capacitor Csn1 and the second snubber capacitor Csn2 may be connected in series to each other, and if a negative voltage is applied to the snubber circuit 260, the first snubber capacitor Csn1 and the second snubber capacitor Csn2 may be connected in parallel with each other.

The snubber inductor Lsn may also prevent a rapid change in current flowing in the first snubber capacitor Csn1 and the second snubber capacitor Csn2. By preventing the rapid change in current flowing in the first snubber capacitor and the second snubber capacitor Csn2, the snubber inductor Lsn may also prevent a rapid change in voltage to be applied to the first rectifying diode D1 and the second rectifying diode D2.

Since the snubber inductor Lsn is connected in series with the first snubber capacitor Csn1 and the second snubber capacitor Csn2, the same current as that flowing in the first snubber capacitor Csn1 and the second snubber capacitor Csn2 may flow in the snubber inductor Lsn. Since the rapid change in current in the snubber inductor Lsn is prevented because of the inductance, the snubber inductor Lsn may prevent a rapid change in current flowing in the first snubber capacitor Csn1 and the second snubber capacitor Csn2.

As such, by preventing a rapid change in voltage to be applied to the first rectifying diode D1 and the second rectifying diode D2, the snubber circuit 260 may prevent application of overcurrent to the first rectifying diode D1 and the second rectifying diode D2.

The snubber circuit 260 may include lossless elements, such as inductor, capacitor, diode, etc., and may not include lossy elements such as resistor. As a result, the snubber circuit 260 may consume almost no power while being operated.

Prevention of ringing by the snubber circuit 260 will now be described.

Figure 11:
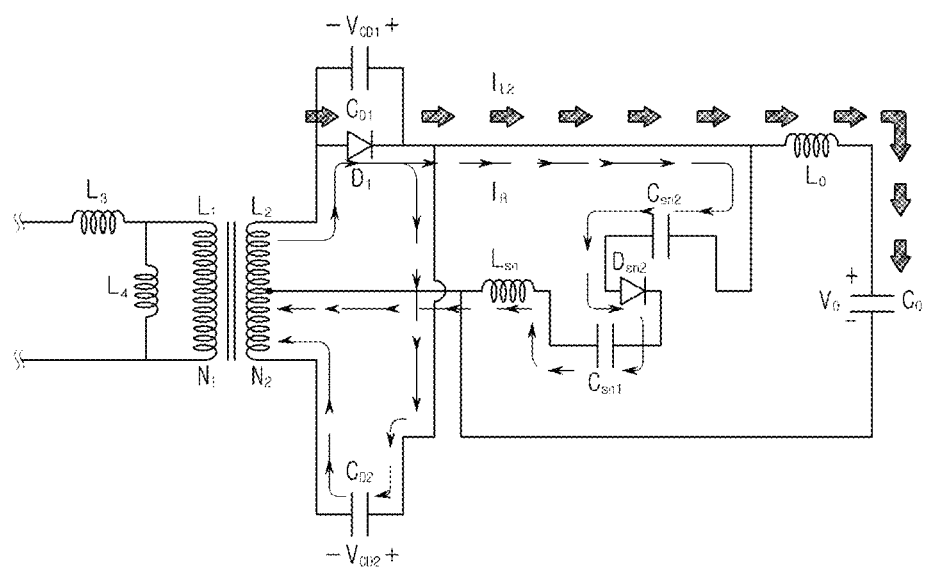
FIGS. 11 and 12 show operation of the DC-DC converter shown in FIG. 10.
Figure 12:
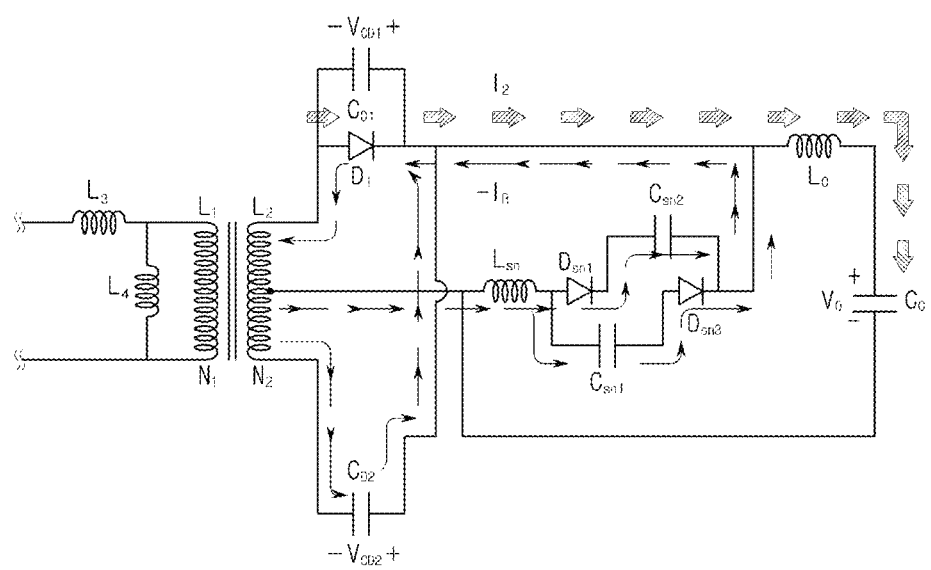
Figure 13:
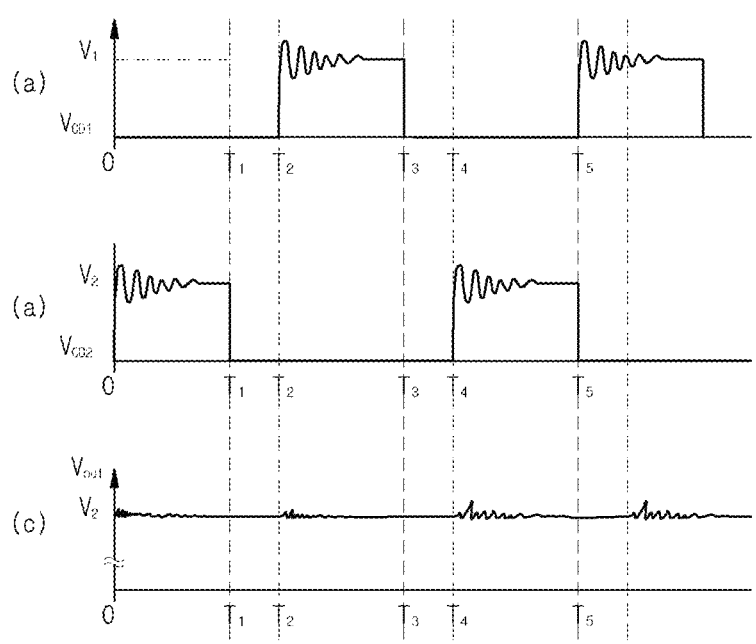
FIG. 13 shows voltages applied to the rectifying circuit of the DC-DC converter shown in FIG. 10 and an output voltage therefrom.

FIGS. 11 and 12 show an example of operation of the DC-DC converter shown in FIG. 10. FIG. 13 shows voltages applied to the rectifying circuit of the DC-DC converter shown in FIG. 10 and an output voltage therefrom.

As described above in connection with FIGS. 7 and 8, depending on operation of the driving circuit 230, the forward current IL2 or the reverse current −IL2 may be induced to the secondary coil L2 of the transformer 220.

The forward current IL2 and the reverse current −IL2 may be rectified by the rectifying circuit 240. Specifically, the first rectifying diode D1 of the rectifying circuit 240 may block the reverse current −IL2 of the secondary coil L2, and the second rectifying diode D2 may block the forward current IL2 of the secondary coil L2.

While the first rectifying diode D1 is blocking the reverse current −IL2, the output voltage Vo from the output circuit 250 may be applied to the first rectifying diode D1, and while the second rectifying diode D2 is blocking the forward current IL2, the output voltage Vo from the output circuit 250 may be applied to the second rectifying diode D2.

Not only the output voltage Vo from the output circuit 250 but also overvoltage due to resonance between the leakage inductor L3 of the transformer 220 and the first parasitic capacitor Cd1 and the second parasitic capacitor Cd2 of the first rectifying diode D1 and the second rectifying diode D2 may be applied to the first rectifying diode D1 and the second rectifying diode D2.

The snubber circuit 260 may mitigate the overvoltage due to the resonance.

For example, as shown in FIG. 11, while the second rectifying diode D2 is blocking the forward current IL2 of the secondary coil L2, a forward resonant current IR may be applied to the second parasitic capacitor Cd2 of the second rectifying diode D2. Due to the forward resonance current IR, voltage of the second parasitic capacitor Cd2 may increase.

In this case, the forward resonant current IR may be supplied not only to the second parasitic capacitor Cd2 but also to the snubber circuit 260. While the forward resonant current IR is being applied, the first snubber capacitor Csn1 and the second snubber capacitor Csn2 may be connected in series through the second snubber diode Dsn2. With the series connection of the first snubber capacitor Csn1 and the second snubber capacitor Csn2, the forward resonant current IR may flow through both the second snubber capacitor Csn2 and the first snubber capacitor Csn1. The first snubber capacitor Csn1 and the second snubber capacitor Csn2 may be charged with the forward resonant current IR, and the voltage may increase.

The forward resonant current IR may flow through the snubber inductor Lsn. The inductance component of the snubber inductor Lsn may prevent a rapid change in the forward resonant current IR. In other words, the snubber inductor Lsn may prevent a rapid increase in the forward resonant current IR.

With the snubber inductor Lsn preventing a rapid increase in the forward resonant current IR, the rapid increase in the forward resonant current IR flowing in the first snubber capacitor Csn1 and the second snubber capacitor Csn2 may be prevented and a rapid increase in voltage of the first snubber capacitor Csn1 and the second snubber capacitor Csn2 may be prevented.

Since an end of the second snubber capacitor Csn2 is connected to the second parasitic capacitor Cd2 of the second rectifying diode D2, a rapid increase in voltage of the second parasitic capacitor Cd2 may also be prevented.

As shown in FIG. 12, while the second rectifying diode D2 is blocking the forward current IL2 of the secondary coil L2, a reverse resonant current −IR may be output from the second parasitic capacitor Cd2 of the second rectifying diode D2. Due to the reverse resonance current −IR, voltage of the second parasitic capacitor Cd2 may decrease.

In this case, the reverse resonant current −IR may be output not only from the second parasitic capacitor Cd2 but also from the snubber circuit 260. While the reverse resonant current −IR is being output, the first snubber capacitor Csn1 and the second snubber capacitor Csn2 may be connected in parallel through the first snubber diode Dsn1 and the third snubber diode Dsn3. With the parallel connection of the first snubber capacitor Csn1 and the second snubber capacitor Csn2, the reverse resonant current −IR may be output from each of the first snubber capacitor Csn1 and the second snubber capacitor Csn2. The first snubber capacitor Csn1 and the second snubber capacitor Csn2 may be discharged by the reverse resonant current −IR, and the voltage may decrease.

The reverse resonant current −IR may flow through the snubber inductor Lsn. The inductance component of the snubber inductor Lsn may prevent a rapid change in the reverse resonant current −IR. In other words, the snubber inductor Lsn may prevent a rapid increase in the reverse resonant current −IR.

With the snubber inductor Lsn preventing a rapid increase in the reverse resonant current −IR, the rapid increase in the reverse resonant current flowing in the first snubber capacitor Csn1 and the second snubber capacitor Csn2 may be prevented and a rapid decrease in voltage of the first snubber capacitor Csn1 and the second snubber capacitor Csn2 may be prevented.

Since ends of the first snubber capacitor Csn1 and the second snubber capacitor Csn2 are connected to the second parasitic capacitor Cd2 of the second rectifying diode D2, a rapid decrease in voltage of the second parasitic capacitor Cd2 may also be prevented.

As such, with the snubber circuit 260, rapid increase and decrease in voltage of the second parasitic capacitor Cd2 may be suppressed, and a change in voltage to be applied to the second rectifying diode D2 may be reduced.

In other words, a magnitude of the resonant voltage applied to the second rectifying diode D2 may decrease, and the ringing amplitude of the voltage applied to the second rectifying diode D2 may decrease. Further, application of overvoltage to the second rectifying diode D2 may be prevented.

The snubber circuit 260 may decrease the magnitude of resonant voltage applied not only to the second rectifying diode D2 but also to the first rectifying diode D1, and the ringing amplitude of the voltage applied to the first rectifying diode D1 may decrease. Further, application of overvoltage to the first rectifying diode D1 may be prevented.

As shown in (a) of FIG. 13, due to resonance between the leakage inductor L3 and the first parasitic capacitor Cd1, a voltage applied to the first rectifying diode D1 may oscillate. The snubber circuit 260 may, however, help a noticeable decrease in the oscillation amplitude of the voltage of the first rectifying diode D1, and oscillation of resonant voltage may prevent application of overvoltage to the first rectifying diode D1.

As shown in (b) of FIG. 13, due to resonance between the leakage inductor L3 and the first parasitic capacitor Cd1, a voltage applied to the second rectifying diode D2 may oscillate, and the snubber circuit 260 may help noticeable decrease in the oscillation amplitude of the voltage of the second rectifying diode D2. As a result, oscillation of the resonant voltage may prevent application of overvoltage to the second rectifying diode D2.

Further, due to the decreased ringing effect in the first rectifying diode D1 and the second rectifying diode D2, output voltage Vout output from the DC-DC converter 100 may have decreased ripples as well, as shown in (c) of FIG. 13.

The PSFB converter has thus far been described.

The DC-DC converter, however, is not limited to the phase shift full bridge converter, but may include various types of DC-DC converter.

Figure 14:
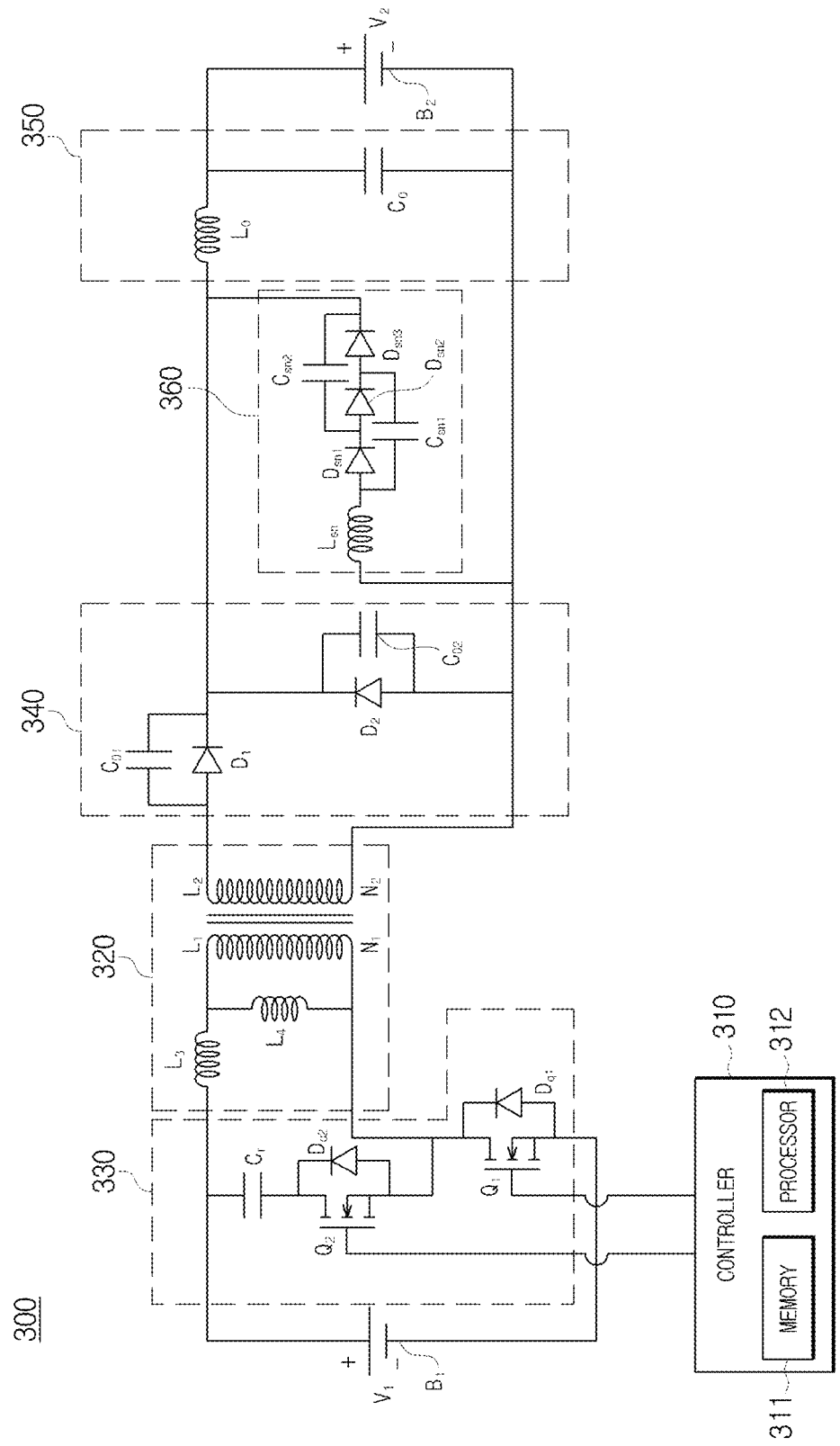
FIG. 14 shows another example of a DC-DC converter, according to an embodiment of the present disclosure.

FIG. 14 is another example of a DC-DC converter, according to an embodiment of the present disclosure.

Referring to FIG. 14, a DC-DC converter 300 may include a transformer 320, a driving circuit 330, a rectifying circuit 340, an output circuit 350, an inductive/capacitive snubber circuit 360, and a controller 310.

The transformer 320 may include a primary coil L1 on the input side, a secondary coil L2 on the output side, and an iron core for transferring a magnetic field from the primary coil L1 to the secondary coil L2. On the contrary to the transformer 120 shown in FIG. 5, the transformer 320 does not include a center tap CT.

The secondary coil L2 may output a voltage proportional to an input voltage of the primary coil L1. Specifically, a ratio of an output voltage of the secondary coil L2 to the input voltage of the primary coil L1 may be proportional to a ratio of the number of turns N2 of the secondary coil L2 to the number of turns N1 of the primary coil L1. In other words, the output voltage of the secondary coil L2 may be calculated by multiplication of the input voltage of the primary coil L1 and the ratio of the number of turns N2/N1.

The transformer 320 may further include a leakage inductor L3, and a magnetizing inductor L4.

The driving circuit 330 may include a driving switch Q1, a reset capacitor Cr, and a reset switch Q2.

The driving switch Q1 may be connected in series with the primary coil L1 of the transformer 320, and current control may be performed such that an AC current is input to the primary coil L1. Specifically, the driving switch Q1 may pass or block a DC current output from the first battery B1 such that an AC current is input to the transformer 320. In other words, the driving switch Q1 may repeat passing and blocking the current to the transformer 320 from the first battery B1 at high speed.

The driving switch Q1 may include a first freewheeling diode Dq1 to protect the driving switch Q1 from reverse voltage.

The reset capacitor Cr and the reset switch Q1 may be connected in series to each other, which may be connected in parallel with the transformer 320.

The reset capacitor Cr may emit magnetic energy stored in the magnetizing inductor L4 of the transformer 320. According to accumulated magnetic energy, the magnetizing inductor L4 may produce a current and the reset capacitor Cr may store the current of the magnetizing inductor L4 into electric energy.

The reset switch Q2 may control current to emit the accumulated magnetic energy in the magnetizing inductor L4. In other words, upon operation of the reset switch Q2, the magnetic energy stored in the magnetizing inductor L4 of the transformer 320 may be emitted to the reset capacitor Cr or the emission of the magnetic energy may be prevented.

The reset switch Q2 may include a second freewheeling diode Dq2 to protect the reset switch Q2 from reverse voltage.

The controller 310 may include a memory and a processor, and may output driving signals to alternately open/close the driving switch Q1 and the reset switch Q2.

The rectifying circuit 340 may include a first rectifying diode D1 and a second rectifying diode D2.

The first rectifying diode D1 and the second rectifying diode D2 may be connected to either ends of the secondary coil L2 of the transformer 320. Specifically, the anode of the first rectifying diode D1 may be connected to an end of the primary coil L2, and the anode of the second rectifying diode D2 may be connected to the other end of the secondary coil L2. The cathodes of the first rectifying diode D1 and the second rectifying diode D2 may be connected to the output circuit 350.

The first rectifying diode D1 may convert AC voltage and AC current output from the secondary coil L2 of the transformer 320 to DC voltage and DC current. Specifically, the first rectifying diode D1 may pass the forward current output from the secondary coil L2 and block reverse current.

The second rectifying diode D2 may block the forward current output from the secondary coil L2 and pass a current caused by an output inductor Lo included in the output circuit 350.

The first rectifying diode D1 and the second rectifying diode D2 may include a first parasitic capacitor Cd1 and a second parasitic capacitor Cd2, respectively, due to structural characteristics, and the first parasitic capacitor Cd1 and the second parasitic capacitor Cd2 may be connected in parallel with the first rectifying diode D1 and the second rectifying diode D2, respectively.

The output circuit 350 may include the output inductor Lo and an output capacitor Co, which may be the same as the output circuit 150 of FIG. 5.

The snubber circuit 360 may suppress overvoltage to be applied to the second rectifying diode D2. While the second rectifying diode D2 is blocking forward current output from the secondary coil L2, an output voltage Vo output from the output circuit 350 and a resonant voltage from resonance between the leakage inductor L3 of the transformer 320 and the second parasitic capacitor Cd2 may be applied to the second rectifying diode D2. The resonance voltage may cause damage to the second rectifying diode D2.

The snubber circuit 360 may suppress the resonant voltage to be applied to the second rectifying diode D2.

The snubber circuit 360 may be connected in parallel with the second rectifying diode D2. Specifically, an end of the snubber circuit 360 may be connected to the cathode of the second rectifying diode D2, and the other end of the snubber circuit 360 may be connected to the anode of the second rectifying diode D2.

The snubber circuit 360 may include a first snubber diode Dsn1, a second snubber diode Dsn2, and a third snubber diode Dsn3 (e.g., first to third snubber diodes Dsn1 to Dsn3), a first snubber capacitor Csn1 and a second snubber capacitor Csn2, and a snubber inductor Lsn.

The first to third snubber diodes Dsn1 to Dsn3 are sequentially connected in series between the cathode and anode of the second rectifying diode D2, and the snubber inductor Lsn may be connected in series with the third snubber diode Dsn3.

The first snubber capacitor Csn1 and the second snubber capacitor Csn2 may each be connected in parallel with some of the first to third snubber diodes Dsn1 to Dsn3. Specifically, the first snubber capacitor Csn1 may be connected in parallel with the first snubber diode Dsn1 and the second snubber diode Dsn2, and the second snubber capacitor Csn2 may be connected in parallel with the second snubber diode Dsn2 and the third snubber diode Dsn3.

The snubber circuit 360 may prevent a rapid change in voltage to be applied to the second rectifying diode D2 and/or in current to be supplied to the second parasitic capacitor Cd2 of the second rectifying diode D2. The first snubber capacitor Csn1 and the second snubber capacitor Csn2 may prevent a rapid change in voltage to be applied to the second rectifying diode D2, and the snubber inductor Lsn may prevent a rapid change in current flowing in the second parasitic capacitor Cd2.

As such, by preventing a rapid change in voltage to be applied to the second rectifying diode D2, the snubber circuit 360 may prevent application of overcurrent to the second rectifying diode D2.

The snubber circuit 360 may include lossless elements such as inductor, capacitor, diode, etc., and may not include lossy elements such as resistor. As a result, the snubber circuit 360 may consume almost no power while being operated.

Figure 15:
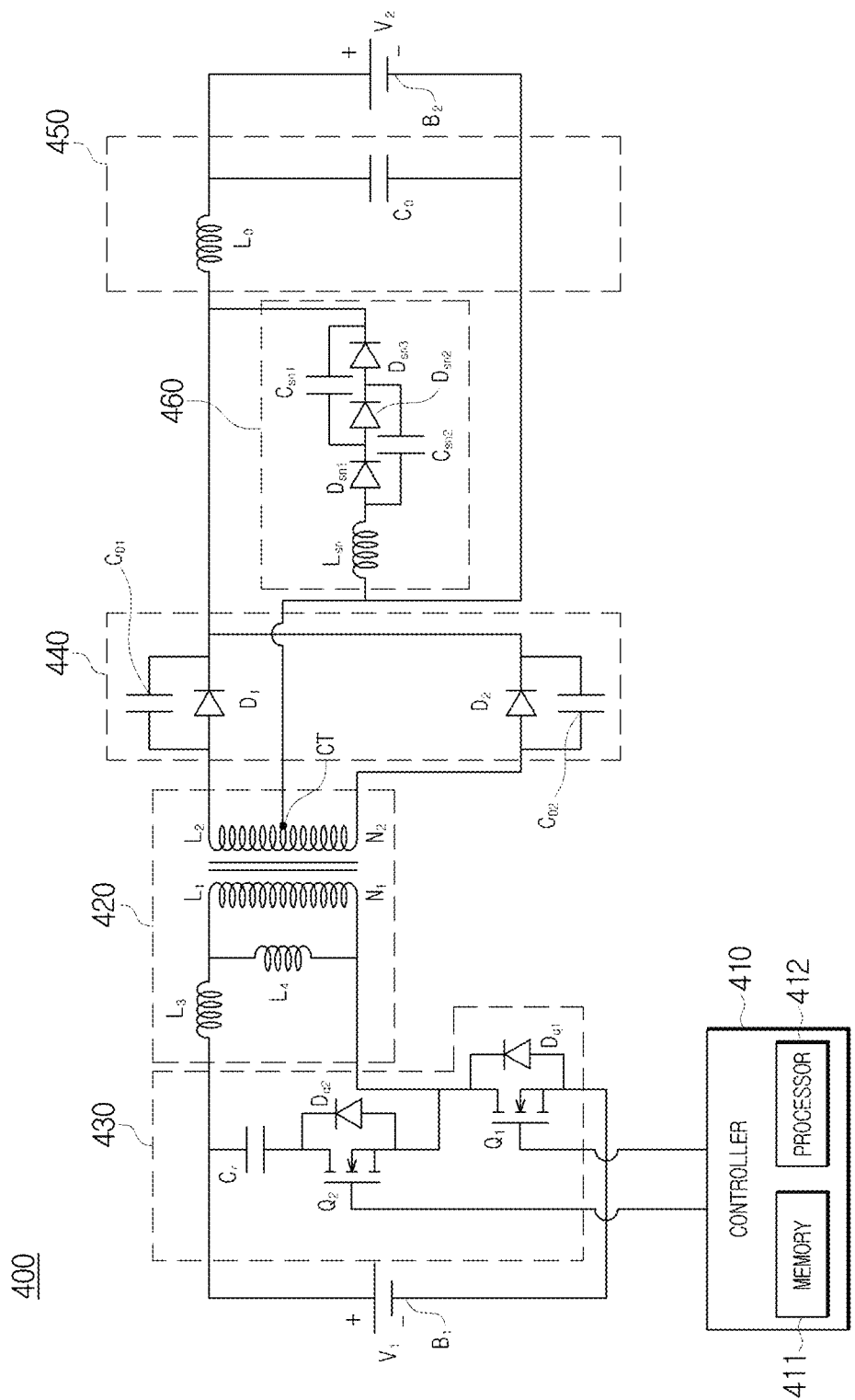
FIG. 15 shows another example of a DC-DC converter, according to an embodiment of the present disclosure.

FIG. 15 is another example of a DC-DC converter, according to an embodiment of the present disclosure.

Referring to FIG. 15, a DC-DC converter 400 may include a transformer 420, a driving circuit 430, a rectifying circuit 440, an output circuit 450, an inductive/capacitive snubber circuit 460, and a controller 410.

The transformer 420 may be the same as the transformer 120 shown in FIG. 5.

The driving circuit 430 and the controller 410 may be the same as the driving circuit 330 and the controller 310 shown in FIG. 14.

The rectifying circuit 440 and the output circuit 450 may be the same as the rectifying circuit 140 and the output circuit 150 shown in FIG. 5.

Specifically, the rectifying circuit 440 may include a first rectifying diode D1 and a second rectifying diode D2.

The first rectifying diode D1 may block the reverse current output from the secondary coil L2, and while the first rectifying diode D1 is blocking the reverse current, an output voltage Vo output from the output circuit 350 and a resonant voltage from resonance between the leakage inductor L3 of the transformer 320 and the first parasitic capacitor Cd1 may be applied to the first rectifying diode D1. The resonance voltage may cause damage to the first rectifying diode D1.

The second rectifying diode D2 may block the forward current output from the secondary coil L2, and while the second rectifying diode D1 is blocking the forward current, an output voltage Vo output from the output circuit 350 and a resonant voltage from resonance between the leakage inductor L3 of the transformer 320 and the second parasitic capacitor Cd2 may be applied to the second rectifying diode D2. The resonance voltage may cause damage to the second rectifying diode D2.

The snubber circuit 460 may suppress the resonant voltage to be applied to the first rectifying diode D1 and the second rectifying diode D2.

The snubber circuit 460 may be connected in parallel with the first rectifying diode and the second rectifying diode D2. Specifically, an end of the snubber circuit 460 may be connected to cathodes of the first rectifying diode D1 and the second rectifying diode D2, and the other end of the snubber circuit 460 may be connected to the center tab CT of the transformer 420.

The snubber circuit 460 may include a first snubber diode Dsn1, a second snubber diode Dsn2, and a third snubber diode Dsn3 (e.g., first to third snubber diodes Dsn1 to Dsn3), a first snubber capacitor Csn1 and a second snubber capacitor Csn2, and a snubber inductor Lsn.

The first to third snubber diodes Dsn1 to Dsn3 are sequentially connected in series between the cathode and anode of the second rectifying diode D2, and the snubber inductor Lsn may be connected in series with the third snubber diode Dsn3.

The first snubber capacitor Csn1 and the second snubber capacitor Csn2 may each be connected in parallel with some of the first to third snubber diodes Dsn1 to Dsn3. Specifically, the first snubber capacitor Csn1 may be connected in parallel with the first snubber diode Dsn1 and the second snubber diode Dsn2, and the second snubber capacitor Csn2 may be connected in parallel with the second snubber diode Dsn2 and the third snubber diode Dsn3.

The snubber circuit 460 may prevent a rapid change in voltage to be applied to the first rectifying diode D1 and the second rectifying diode D2 and/or in current to be supplied to the first parasitic capacitor Cd1 and the second parasitic capacitor Cd2 of the first rectifying diode D1 and the second rectifying diode D2. The first snubber capacitor Csn1 and the second snubber capacitor Csn2 may prevent a rapid change in voltage to be applied to the first rectifying diode D1 or the second rectifying diode D2, and the snubber inductor Lsn may prevent a rapid change in current flowing in the first parasitic capacitor Cd1 or the second parasitic capacitor Cd2.

As such, by preventing a rapid change in voltage applied to the first rectifying diode D1 or the second rectifying diode D2, the snubber circuit 460 may prevent overcurrent from being applied to the first rectifying diode D1 or the second rectifying diode D2.

The snubber circuit 460 may include lossless elements, such as an inductor, a capacitor, a diode, etc., and may not include lossy elements, such as resistor. As a result, the snubber circuit 460 may consume almost no power while being operated.

According to embodiments of the present disclosure, a direct current (DC)-DC converter able to prevent damage to devices and a vehicle having the DC-DC converter may be provided.

Embodiments of the present disclosure have been described above. In the embodiments described above, some components may be implemented as a "module". Here, the term "module" provides, but is not limited to, a software and/or hardware component, such as a Field Programmable Gate Array (FPGA) or Application Specific Integrated Circuit (ASIC), that performs certain tasks. A module may be configured to reside on the addressable storage medium and may be configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that the components and modules execute one or more CPUs in a device.

In addition to the above described embodiments, embodiments may thus be implemented through computer readable code/instructions in/on a medium (e.g., a computer readable medium) to control at least one processing element to implement any above described embodiment. The medium may correspond to any medium/media permitting the storing and/or transmission of the computer readable code.

The computer-readable code may be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element may include at least one processor or at least one computer processor, and processing elements may be distributed and/or included in a single device.

While various embodiments have been described with respect to a limited number of embodiments, those skilled in the art, having the benefit of this disclosure, will appreciate that other embodiments that do not depart from the scope as disclosed herein may be devised. Accordingly, the scope should be limited only by the attached claims.

What is claimed is:

1. A direct current (DC)-DC converter for a vehicle for converting a first voltage output by a first battery to a second voltage output by a second battery, the DC-DC converter comprising:

a transformer comprising a primary coil and a secondary coil, the primary coil being connected to the first battery, the secondary coil being connected to the second battery, wherein the transformer is configured to transform the first voltage to the second voltage;

at least one switch configured to control a first current input to the transformer from the first battery;

at least one rectifying diode configured to rectify an alternate current (AC) output from the transformer; and a snubber circuit configured to prevent overvoltage from being applied to the at least one rectifying diode, wherein the snubber circuit comprises a plurality of diodes connected in series to one another, an inductor connected in series to the plurality of diodes, and at least one capacitor connected in parallel with the plurality of diodes, wherein the plurality of diodes comprises a first diode, a second diode, and a third diode connected in series to one another, and wherein the at least one capacitor comprises a first capacitor and a second capacitor, the first capacitor being connected in parallel with the first diode and the second diode, the second capacitor being connected in parallel with the second diode and the third diode.

2. The DC-DC converter of claim 1, wherein the first capacitor and the second capacitor are connected in series via the second diode while a voltage applied to the at least one rectifying diode is increasing.

3. The DC-DC converter of claim 1, wherein the first capacitor and the second capacitor are connected in parallel via the first diode and the third diode while a voltage applied to the at least one rectifying diode is decreasing.

4. The DC-DC converter of claim 1, wherein the transformer further comprises:
   a primary coil configured to receive the first current; and
   a secondary coil configured to induce a second current according to a magnetic field produced by the primary coil, and
   wherein the secondary coil is divided by a center tap into a first coil and a second coil.

5. The DC-DC converter of claim 4, wherein the at least one rectifying diode comprises:
   a first rectifying diode with an anode connected to the first coil of the secondary coil; and
   a second rectifying diode with an anode connected to the second coil of the secondary coil, and
   wherein cathodes of the first rectifying diode and the second rectifying diode are connected to each other.

6. The DC-DC converter of claim 5, wherein the snubber circuit has one end connected to the center tap of the secondary coil and the other end connected to the cathodes of the first rectifying diode and the second rectifying diode.

7. The DC-DC converter of claim 1, wherein the transformer comprises:
   a primary coil configured to receive the first current; and
   a secondary coil configured to induce a second current according to a magnetic field produced by the primary coil.

8. The DC-DC converter of claim 7, wherein the at least one rectifying diode comprises:
   a first rectifying diode with an anode connected to an end of the secondary coil; and
   a second rectifying diode with an anode connected to the other end of the secondary coil, and
   wherein cathodes of the first rectifying diode and the second rectifying diode are connected to each other.

9. The DC-DC converter of claim 8, wherein the snubber circuit has one end connected to the other end of the secondary coil and the other end connected to the cathodes of the first rectifying diode and the second rectifying diode.

* * * * *